United States Patent
Motoyoshi

(10) Patent No.: US 9,635,675 B2
(45) Date of Patent: Apr. 25, 2017

(54) COMMUNICATION DEVICE, COMMUNICATION METHOD AND NON-TRANSITORY COMPUTER READABLE MEDIUM

(71) Applicant: NEC Corporation, Minato-ku, Tokyo (JP)

(72) Inventor: Gen Motoyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/426,781

(22) PCT Filed: May 22, 2013

(86) PCT No.: PCT/JP2013/003261
§ 371 (c)(1),
(2) Date: Mar. 9, 2015

(87) PCT Pub. No.: WO2014/038111
PCT Pub. Date: Mar. 13, 2014

(65) Prior Publication Data
US 2015/0249996 A1 Sep. 3, 2015

(30) Foreign Application Priority Data
Sep. 7, 2012 (JP) ................................ 2012-197148

(51) Int. Cl.
*H04W 72/08* (2009.01)
*H04L 12/26* (2006.01)
(Continued)

(52) U.S. Cl.
CPC ............. *H04W 72/082* (2013.01); *H04L 1/00* (2013.01); *H04L 41/0896* (2013.01);
(Continued)

(58) Field of Classification Search
None
See application file for complete search history.

(56) References Cited

U.S. PATENT DOCUMENTS

2013/0039214 A1* 2/2013 Yedavalli .............. H04L 45/025
370/254

FOREIGN PATENT DOCUMENTS

| JP | 2011-155508 A | 8/2011 |
| WO | 2010/084775 A1 | 7/2010 |

OTHER PUBLICATIONS

Motoyoshi, G., Wakamiya, N., and Murata, M., "Future mobile network management with attractor selection", In Wireless On-demand Network Systems and Services (WONS), 2012 9th Annual Conference on, IEEE, Jan. 2010, pp. 27-30.
(Continued)

*Primary Examiner* — Ayaz Sheikh
*Assistant Examiner* — Tarell Hampton

(57) ABSTRACT

Problems with communication interface selection control using a fluctuation control equation are that it is difficult for the control to address large environmental variations and that the control requires parameter adjustments according to environments, which incurs operating cost. A communication method according to the present invention includes the step of observing communication environment conditions to generate communication environment data, generating fluctuation information by using the communication environment data as the data occurs, and allocating communication resources by performing attractor selection control on the basis of the fluctuation information. The step of generating fluctuation information comprises the step of using a fluctuation equation to perform fluctuation equation control utilizing the fluctuation information as the fluctuation information occurs. The fluctuation information is not fluctuation terms that are independent random noise terms in the
(Continued)

fluctuation equation but include a fluctuation term reflecting the communication environment data.

9 Claims, 7 Drawing Sheets

(51) Int. Cl.
    *H04W 24/02*     (2009.01)
    *H04L 12/24*     (2006.01)
    *H04L 1/00*     (2006.01)

(52) U.S. Cl.
    CPC ............ *H04L 41/142* (2013.01); *H04L 41/16* (2013.01); *H04W 24/02* (2013.01)

(56) References Cited

OTHER PUBLICATIONS

Leibnitz, K., & Murata, M., "Attractor selection and perturbation for robust networks in fluctuating environments", Network, 24(3), IEEE, May/Jun. 2010, pp. 14-18.
International Search Report for PCT Application No. PCT/JP2013/003261, mailed on Aug. 27, 2013 with Elnglish translation.

\* cited by examiner

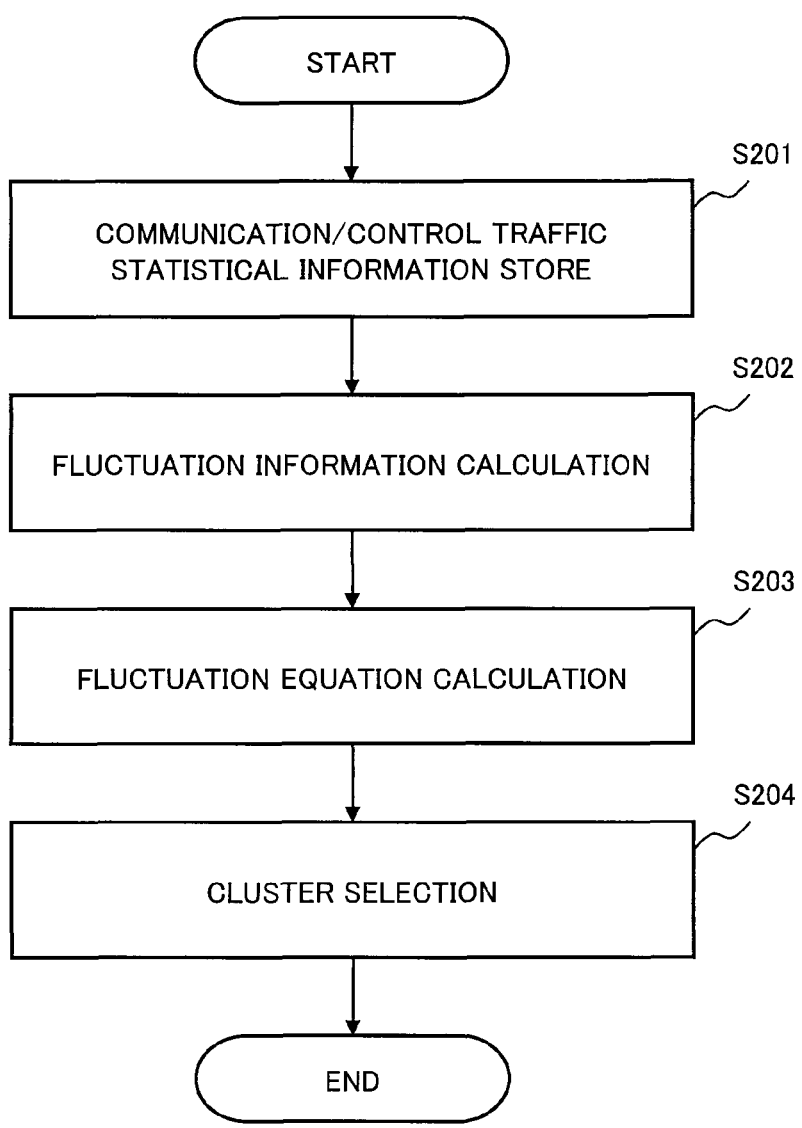

COMMUNICATION DEVICE, COMMUNICATION METHOD AND NON-TRANSITORY COMPUTER READABLE MEDIUM

This application is a National Stage Entry of PCT/JP2013/003261 filed on May 22, 2013, which claims priority from Japanese Patent Application 2012-197148 filed on Sep. 7, 2012, the contents of all of which are incorporated herein by reference, in their entirety.

TECHNICAL FIELD

The present invention provides a communication system that controls allocation of communication resources on the basis of attractor selection control.

BACKGROUND ART

Rapid changes in traffic patterns on a communication network, such as traffic concentration around the same time, are occurring with increasing frequency in these years. To address such rapid variations in traffic patterns, routing control techniques based on attractor selection, which models the mechanism of living organisms behaving adaptively to environmental changes are being studied as one of candidate methods for constructing future new generation network infrastructures. Attractor selection is one of approaches that is based on a biological paradigm and models a state in which living organisms create a stable state (attractor).

In classical control methods in general, responses to changes in a given environment are provided beforehand as algorithms for adapting to environmental changes. Accordingly, adaptation to expected environmental changes can be achieved with a high degree of accuracy. On the other hand, adaptation to unexpected environmental changes adds to the complexity of a system and is difficult to implement. To address the problem, methods that model living organisms have been proposed. Attractor selection, which is one of such methods, uses fluctuations to perform control and therefore has accuracy slightly lower than the classical control methods but has the property of more readily adapting to unknown environmental changes. Accordingly, attractor selection control infrastructure techniques, which are communication techniques to which the attractor selection is applied, have the advantage that systems can flexibly respond to environmental changes such as device failures and communication quality variations.

A fluctuation equation is generally written as:

[Equation 1]

$$\frac{dm}{dt} = \alpha \cdot f(m) + \eta \quad (1)$$

The right-hand side of Equation (1) represents fluctuation information and $\eta$ represents a fluctuation term (noise term). Attractor selection has two behaviors: the fluctuation term $\eta$ (noise term) and a control structure $f(m)$ that has an attractor. The behaviors are controlled by an activity $\alpha$. The activity $\alpha$ is a value indicating a state of the system. When the state of the system degrades, the activity $\alpha$ decreases and the influence of the fluctuation $\eta$ increases relatively. As a result, the state m of the system randomly changes. When m changes and the state of the system is improved, the activity $\alpha$ increases and m is controlled by $f(m)$. Such a mechanism represents a model in which living organisms respond to environmental changes. Description of typical attractor selection is provided in section III of Non Patent Literature 1.

Patent Literature 1 describes a virtual network control method and a virtual network control device that are capable of following environmental variations by using fluctuation equations.

Non Patent Literature 1 describes a next-generation wireless network capable of following environmental variations by using fluctuation equations.

CITATION LIST

Patent Literature

[Patent Literature 1]
Japanese Laid-open Patent Publication No. 2011-155508
[Non Patent Literature 1]
G. Motoyoshi, N. Wakamiya, and M. Murata, "Future Mobile Network Management With Attractor Selection," in proceedings of 2012 9th Annual Conference on Wireless On-Demand Network Systems and Services (WONS '12), January 2012.

SUMMARY OF INVENTION

Technical Problem

The fluctuation terms (noise terms) that constitute the fluctuation equations given in the literatures are independent and use random numbers according to a normal distribution. A system that has such a configuration requires adjustment of a standard deviation value that corresponds to the amplitude of artificial noise in accordance with the levels of environmental variations beforehand in a system design stage in order to perform communication interface selection control using fluctuation control equations. It is therefore difficult to collectively responding to every condition in a wide range, such as a condition where environmental variations are large and a condition where environmental variations are small. Therefore there is a problem that adjustments of parameters to the levels of environmental variations are required, which incurs operating cost.

An object of the present invention is to provide a communication device, a communication method, and a non-transitory computer readable medium that are capable of solving the problem described above.

Solution to Problem

In one aspect, a communication method includes the steps of observing communication environment conditions to generate communication environment data, generating fluctuation information by using the communication environment data as the data occurs, and allocating communication resources by performing attractor selection control on the basis of the fluctuation information. The step of generating fluctuation information comprises the step of using a fluctuation equation to perform fluctuation equation control using the fluctuation information as the fluctuation information occurs. The fluctuation information is not fluctuation terms that are independent random noise terms in the fluctuation equation but include a fluctuation term reflecting the communication environment data.

In another aspect, a communication device is configured to observe communication environment conditions to generate communication environment data. The communication device is further configured to generate fluctuation information by using the communication environment data as the data occurs. The communication device is configured to allocate communication resources by performing attractor selection control on the basis of the fluctuation information. The configuration for generating fluctuation information is configured to use a fluctuation equation to perform fluctuation equation control utilizing the fluctuation information as the fluctuation information occurs. The fluctuation information is configured so that fluctuation terms in the fluctuation equation are not an independent random noise terms but include a fluctuation term reflecting the communication environment data.

In still another aspect, a non-transitory computer readable medium includes a set of instructions for causing a computer to perform the communication method described above.

Advantageous Effects of Invention

The present invention eliminates the need for adjusting a standard deviation value that correspond to the amplitude of artificial noise of a fluctuation term to the levels of environmental variations in a system design stage in order to perform communication interface selection control using a fluctuation control equation. Furthermore, the present invention eliminates the need for parameter adjustments to the levels of environmental variations and therefore can provide a communication system infrastructure with a reduced operating cost.

BRIEF DESCRIPTION OF DRAWINGS

FIG. 7 is a control flowchart of the communication system according to the second exemplary embodiment of the present invention.

DESCRIPTION OF EMBODIMENTS

Figure 2:
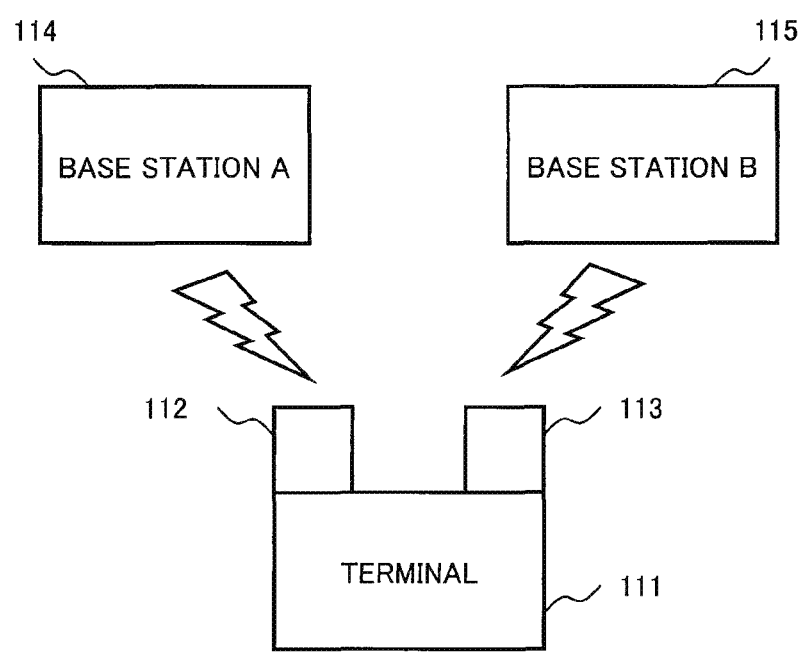
FIG. 2 is a network configuration diagram of the communication system according to the first exemplary embodiment of the present invention.

FIG. 2 illustrates an example of a radio interface selection control system configuration based on related attractor selection control devised in conjunction with the present invention. It is assumed that a communication terminal 111 includes a plurality of radio interfaces, for example radio interfaces 112 and 113. The communication terminal is capable of communicating with a plurality of radio base stations through associated radio interfaces. It is also assumed that for example the radio interface 112 communicates through a radio base station A 114 and the radio interface 113 communicates through a radio base station B 115.

Figure 3:
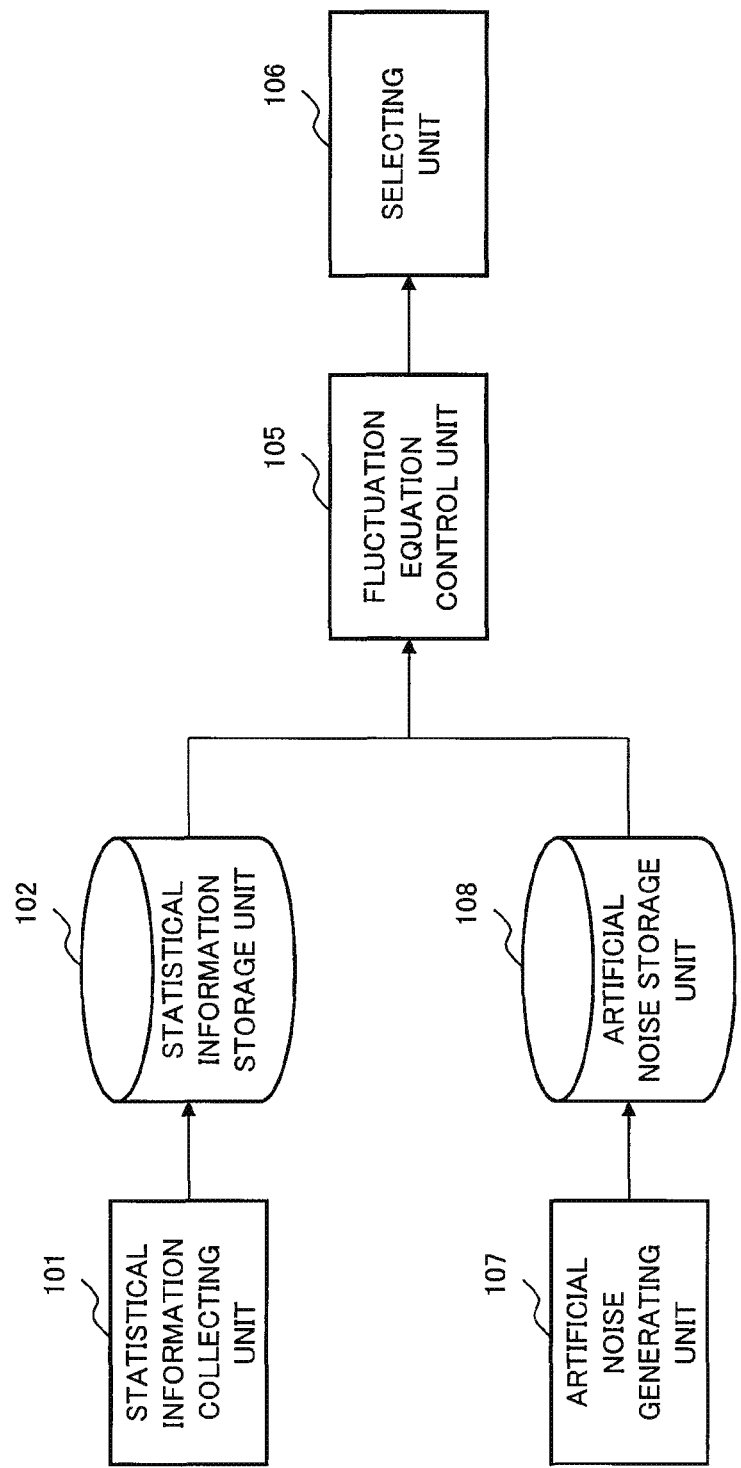
FIG. 3 is a functional block diagram of an existing communication system relating to the present invention.

As illustrated in FIG. 3, the communication terminal includes the function of controlling interface selection and autonomously performs interface selection adaptive to environmental variations. A statistical information collecting unit 101 of the interface selection control function unit collects statistical information concerning communication traffic at the radio interfaces and stores the collected statistical information in a statistical information storage unit 102. An artificial noise generating unit 107 generates random numbers in accordance with white Gaussian noise that is Gaussian-distributed with an average of 0 and stores the resulting random numbers in an artificial noise storage unit 108. A fluctuation equation control unit 105 utilizes the information stored in the statistical information storage unit 102 and the artificial noise storage unit 108 to calculate a fluctuation equation and sends the output result to a selecting unit 106. The selecting unit 106 selects a radio interface to use at the time in accordance with the value. However, the system configuration has a problem that environmental variations need to be predicted and a standard deviation value corresponding to the amplitude of artificial noise needs to be adjusted to the levels of the environmental variations beforehand in a system design stage.

Exemplary Embodiments of the present invention will be described below in detail with reference to drawings.

First Exemplary Embodiment

A communication system of the present invention has a configuration similar to that of the system in FIG. 2 and includes communication terminals and radio base stations. A communication terminal 111 is a terminal capable of transferring communication data and includes a plurality of radio interfaces. For example, the communication terminal 111 includes radio interfaces 112 and 113 and is capable of communicating with a plurality of radio base stations through the associated radio interfaces. For example, the radio interface 112 can communicate through a radio base station A 114 and the radio interface 113 can communicate through a radio base station B 115. The part of the exemplary embodiment described so far is the same as the related techniques.

Figure 1:
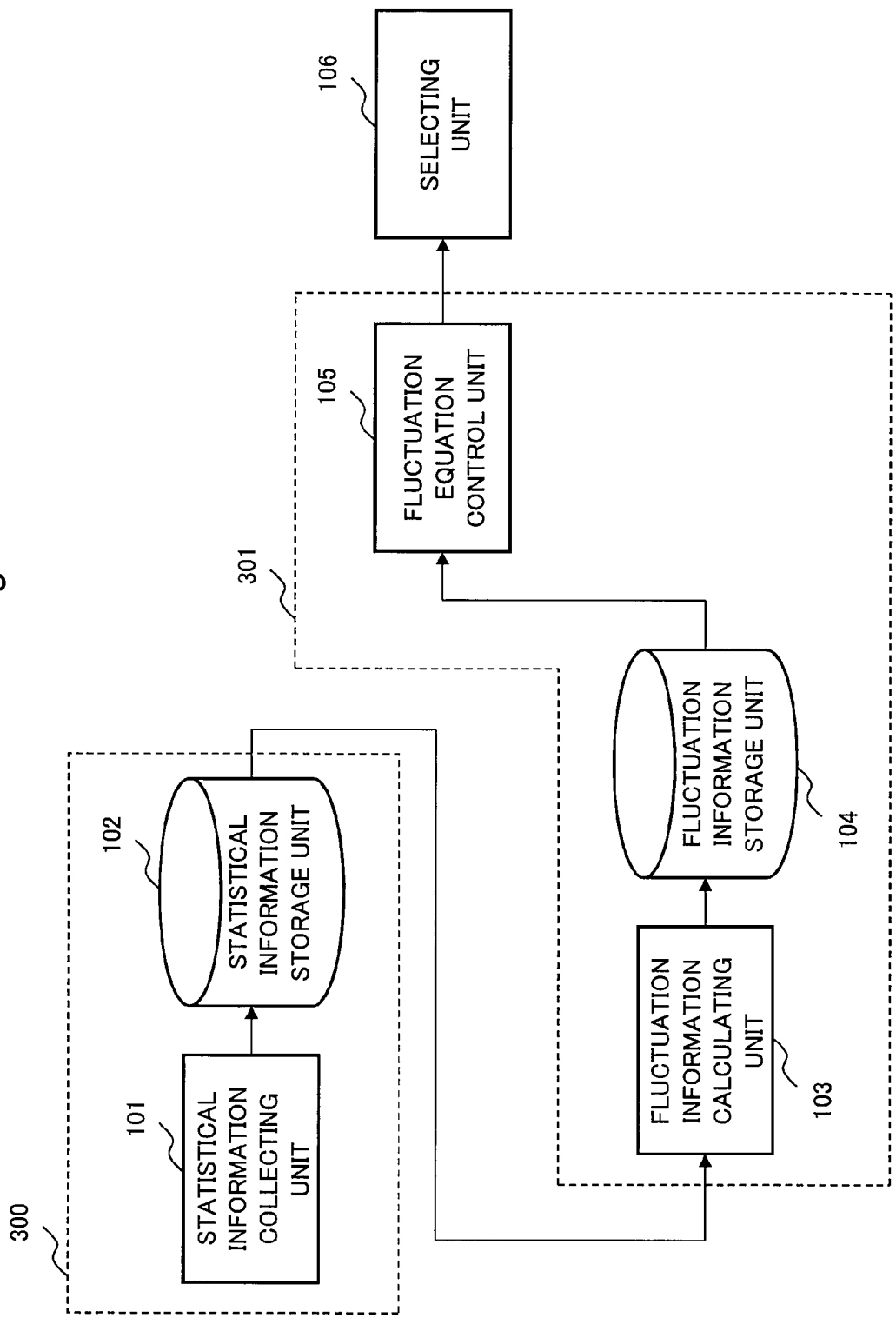
FIG. 1 is a functional block diagram of a communication system according to a first exemplary embodiment of the present invention.

The communication terminal 111 includes a radio interface selecting function therein as illustrated in FIG. 1. The radio interface selecting function unit includes a communication environment data generating device 300, a fluctuation information generating device 301 and a selecting unit 106. The environmental data generating device 300 includes a statistical information collecting unit 101 and a statistical information storage unit 102. The fluctuation information generating device 301 includes a fluctuation information calculating unit 103, a fluctuation information storage unit 104 and a fluctuation equation control unit 105.

The statistical information collecting unit 101 collects statistical information concerning communication traffic at each radio interface and stores the collected information in the statistical information storage unit 102. This operation will be called communication traffic statistical information store step S101. Statistical information concerning communication traffic may be information about instantaneously observed communication quality (for example BER: Bit Error Ratio) at an interface, communication quality information (for example SNR: Signal-Noise Ratio), information about an available communication bandwidth (for example BW: BandWidth) and the like calculated from information about packet losses in communication performed. Equation (2) represents a BER calculating Equation. Equation (3) represents an SNR calculating formula. Equation (4) represents a BW calculating formula.

[Equation 2]

$$\text{BER} = (\text{amount of data successfully received})/(\text{amount of data sent}) \quad (2)$$

[Equation 3]

$$\text{SNR} = 2 \times \text{erfc}^{-1}(2 \times \text{BER}) \quad (3)$$

[Equation 4]

$$\text{BW} = (\text{amount of data successfully received})/(\text{unit time}) \quad (4)$$

Here, erfc is a complementary error function and is generally defined as Equations (5) and (6) given below using an error function erf, which is a type of special function of sigmoid shape.

[Equation 5]

$$erfc(x) = 1 - erf(x) \quad (5)$$
$$= \frac{2}{\sqrt{\pi}} \int_x^\infty e^{-t^2} dt$$

[Equation 6]

$$erf(x) = \frac{2}{\sqrt{\pi}} \int_o^x e^{-t^2} dt \quad (6)$$

The fluctuation information calculating unit 103 calculates a fluctuation term $\eta'k$ on the basis of observational data from the communication traffic statistical information given above. The fluctuation term $\eta'k$ in interface k can be written as Equation (7) given below. Average μk of BER history of the interface is subtracted from instantaneously observed communication quality information BERk to shift the average of fluctuations toward 0 and the result is multiplied by a fixed-value parameter Ck to adjust amplitude for adaptation to environmental variations. The parameter Ck and the communication quality information BERk may be values specific to each interface or may be values common to the interfaces. The fluctuation terms $\eta'k$ thus calculated are stored in the fluctuation information storage unit 104. This operation will be called a fluctuation information calculation step S102.

[Equation 7]

$$\eta_k' = C_k(\text{BER}_k - \mu_k) \quad (7)$$

The fluctuation equation control unit 105 uses the information stored in the statistical information storage unit 102 and the fluctuation information storage unit 108 to calculate fluctuation equations in Equations (8) to (10) given below (the equations given here are for a case where there are M selectable interfaces). This operation will be called a fluctuation equation calculation step S103. The output results are provided to the selecting unit 106, where a radio interface to be used at the time is selected. This operation will be called an interface selection step S104. The fluctuation equation is grounded on a biological control mechanism, which is detailed in Non Patent Literature 1. Output value mk of the fluctuation equation for interface k is updated one after another in accordance with the differential equations given below. Interface k that has the largest value among the output values mk is the interface to be selected under the current environment conditions. β, γ, G, A, θ, Wi and Wj are fixed system parameters. These parameters are adjusted beforehand to optimum values in a system design stage.

[Equation 8]

$$\frac{dm_k}{dt} = \frac{\alpha(\beta\alpha^\gamma + 1/\sqrt{2})}{1 + \max(m_1, \ldots, m_M)^2 - m_k^2} - \alpha m_k + \eta_k' \quad (8)$$

[Equation 9]

$$\alpha = \frac{1}{1 + \exp(-G(Q - A))} \quad (Q \geq 0) \quad (9)$$

[Equation 10]

$$Q = \left( \theta \sum_{i=1}^M \left( \frac{W_i SNR_i}{\max(SNR_{i,t-N}, SNR_{i,t-N+1}, \ldots, SNR_{i,t})} \right) \middle/ M + \right.$$
$$\left. (1-\theta) \sum_{j=1}^M \left( \frac{W_j SNR_j}{\max(SNR_{j,t-N}, SNR_{j,t-N+1}, \ldots, SNR_{j,t})} \right) \middle/ M \right) \middle/$$
$$(W_i + W_j) \quad (10)$$

In fluctuation equation (8), the certainty of the selected interface is represented by α. In conditions where α takes a large value, the control terms (the first and second terms of the right-hand side of the fluctuation differential equation) based on communication traffic statistical information become dominant and fine interfaces selection control based on environmental information is performed. On the other hand, in conditions where α takes a small value, the noise term (the third term of the right-hand side of the fluctuation differential equation) which randomly varies becomes dominant and random interface selection control is performed.

Figure 4:
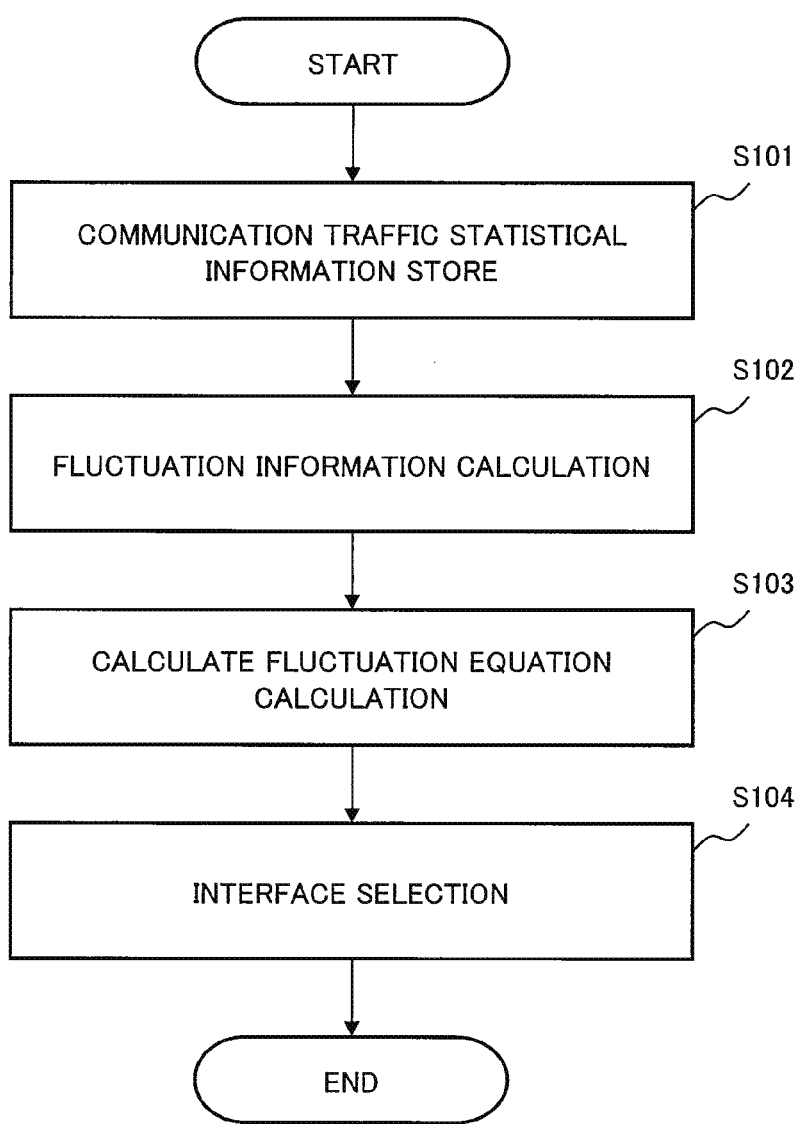
FIG. 4 is a control flowchart of the communication system according to the first exemplary embodiment of the present invention.

The fluctuation term (noise term) utilized in the present invention is a fluctuation term generated by utilizing communication traffic statistical information, rather than an independent random noise term. Accordingly, the first and second terms of the right-hand side of the fluctuation differential equation correlate with the third term of the right-hand side of the fluctuation differential equation to some degree and noise term that correlates with environmental variations can be obtained. Therefore, a system is provided that eliminates the need for adjustment of the amplitude of noise term in accordance with environmental variations, which is the problem with the related systems. FIG. 4 flowcharts the description of this exemplary embodiment of the present invention given above.

Second Exemplary Embodiment

While selection of a radio interface is used as the system for which fluctuation control is used in the first exemplary embodiment, the control mechanism can be applied to other systems.

Figure 5:
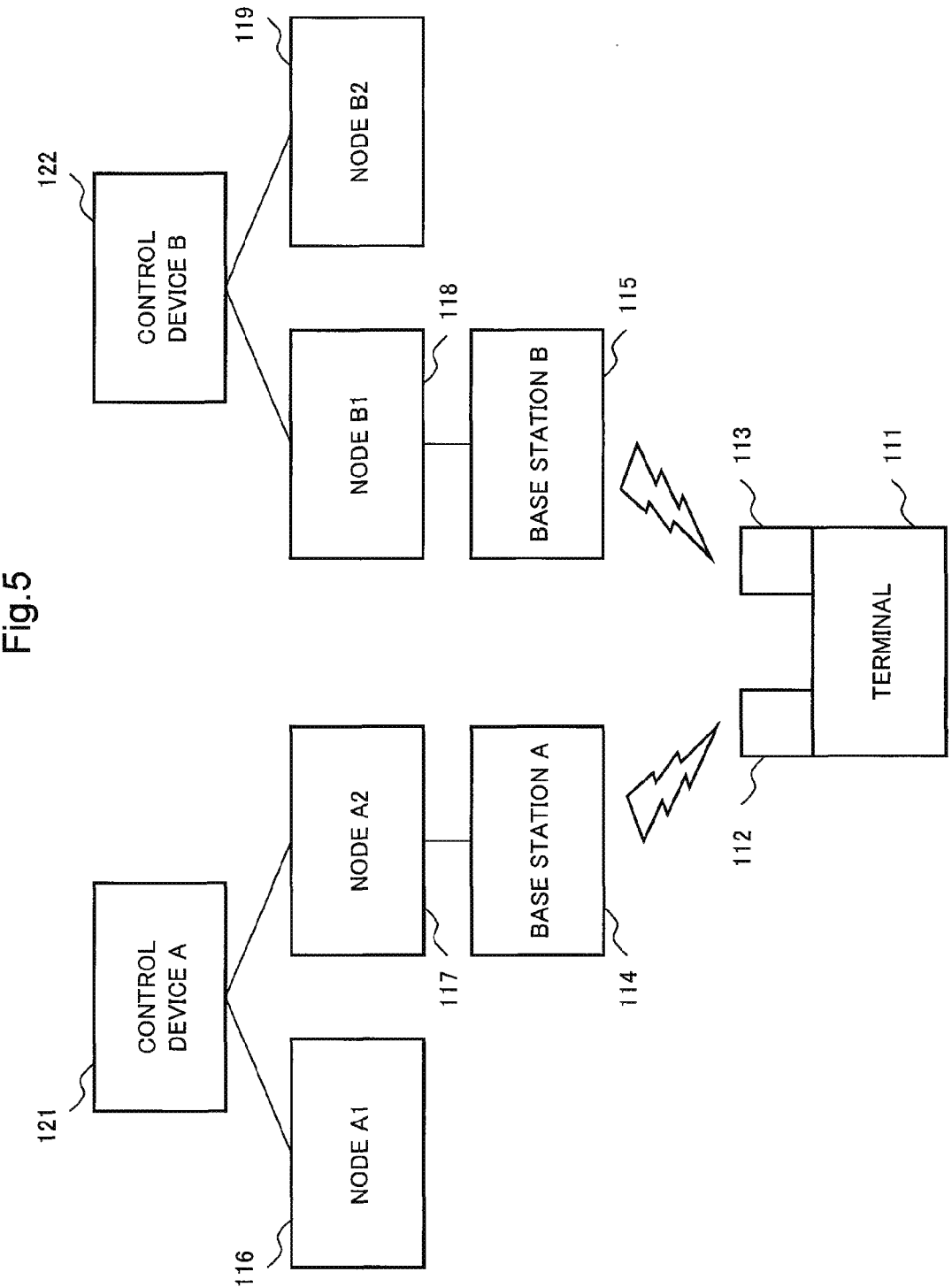
FIG. 5 is a network configuration diagram of a communication system (before a domain change) according to a second exemplary embodiment of the present invention.
Figure 6:
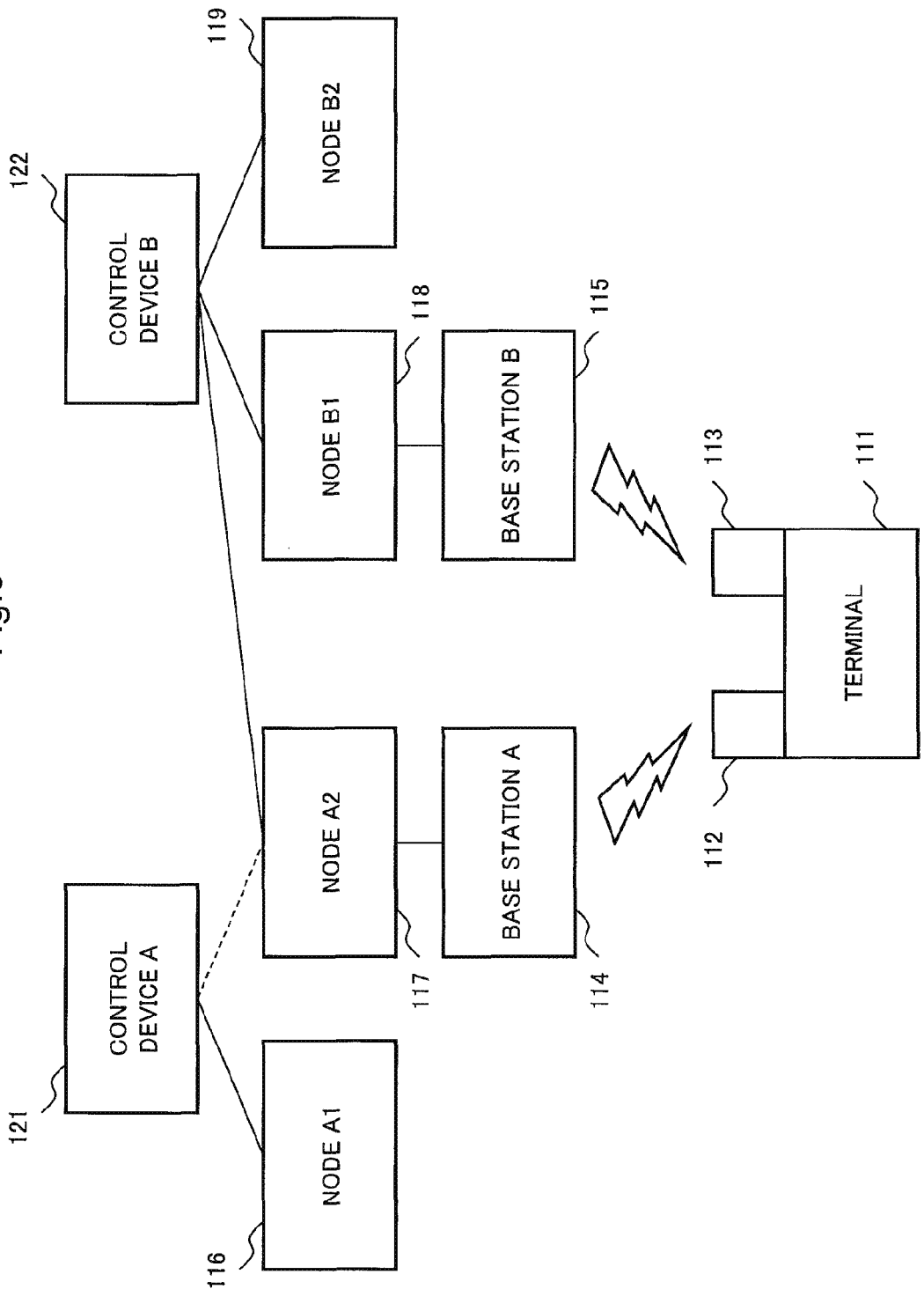
FIG. 6 is a network configuration diagram of the communication system (after the domain change) according to the second exemplary embodiment of the present invention.

FIG. 5 illustrates a system configuration diagram. A communication network is made up of a plurality of domains in each of which a control device manages a plurality of communication nodes. As the number of communication terminals that move between base station A and base station B across a domain boundary increases, a problem arises that the amount of control signals between the domains increases. To solve the problem, a system can be provided that uses fluctuation control to change a domain (select a cluster) to which base stations and communication nodes with many communication terminals performing inter-domain handovers belong. An example is illustrated in FIG. 6 in which node A2 and base station A that belonged to domain A are moved from domain A to domain B.

The domain change process is controlled in accordance with the same fluctuation equation that is used in the first exemplary embodiment. First, communication environment data is acquired and stored (communication/control traffic statistical information store step S201). Then, fluctuation information is calculated from the data (fluctuation information calculation step S202). Then each control device calculates fluctuation equation information for communication nodes that belong to its own domain S203. The domain to which a base station and a communication node belong is changed (a cluster is selected) 5204.

Since control based on the amount of inter-domain control signals is performed in this system, k of an equation output mk represents the domain to which the communication node is to belong. Moreover, a control equation Q is represented by using the amount of control signal traffic against the amount of user traffic that passes the communication node in this system, thereby the control equation Q can implement the control in order that a communication node through which a large amount of control signals passes come to belong to another domain. FIG. 7 illustrates a flowchart.

Other Exemplary Embodiments

A communication system that controls allocation of communication resources on the basis of attractor selection control described in the exemplary embodiments may be implemented using a semiconductor processing device including an ASIC (Application Specific Integrated Circuit). Furthermore, the method may be implemented by causing a computer system including at least one processor (for example, a microprocessor, MPU, or DSP (Digital Signal Processor)) to execute a program. Specifically, one or more programs including an instruction set for causing a computer system to execute an algorithm concerning a bias voltage control described with reference to flowcharts and other drawings may be written and the program or programs may be provided to the computer.

The programs can be stored on any of various types of non-transitory computer readable media and provided to a computer. The non-transitory computer readable media include various types of tangible media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

While the present invention has been described with reference to exemplary embodiments thereof, the present invention is not limited by the exemplary embodiments described above. Various modifications that are apparent to those skilled in the art can be made to the configurations and details of the present invention within the scope of the invention.

This application is based upon and claims the benefit of priority from Japanese Patent Application No. 2012-197148 filed on Sep. 7, 2012, the entire contents of the disclosure are incorporated herein.

REFERENCE SIGNS LIST

101 . . . Statistical information collecting unit
102 . . . Statistical information storage unit
103 . . . Fluctuation information calculating unit
104 . . . Fluctuation information storage unit
105 . . . Fluctuation equation control unit
106 . . . Selecting unit
107 . . . Artificial noise generating unit
108 . . . Artificial noise storage unit
111 . . . Communication terminal
112 . . . Radio interface #1
113 . . . Radio interface #2
114 . . . Base station A
115 . . . Base station B
116 . . . Network node A1
117 . . . Network node A2
118 . . . Network node B1
119 . . . Network node B2
121 . . . Control device A
122 . . . Control device B
300 . . . Communication environment data generating device
301 . . . Fluctuation information generating device

What is claimed is:

1. A communication method for allocating communication resources based on attractor selection control using a fluctuation equation, comprising:
generating, by a communication environment data generating device, communication environment data by observing communication environment conditions;
calculating, by a fluctuation information generating device, a fluctuation term of fluctuation information to be used in the fluctuation equation, by using the communication environment data as the communication environment data occurs, and performing fluctuation equation calculation using the fluctuation term in which the communication environment data is being reflected; and
allocating the communication resources, in a selecting unit, based on output results of the fluctuation equation calculation,
wherein the calculating the fluctuation term comprises shifting an average value of fluctuations toward zero by subtracting an average value of a history of the communication environment data from observed communication environment data, and adjusting an amplitude of the shifted fluctuation term for adaptation to environmental variations by multiplying a given parameter into the shifted fluctuation term,
wherein the communication environment data is communication quality information at a plurality of radio interfaces of a communication terminal which is capable of communicating with a plurality of radio base stations, and
wherein the allocating the communication resources comprises selecting a radio interface having the largest value of output results of the fluctuation equation calculation.

2. A communication method for allocating communication resources based on attractor selection control using a fluctuation equation, comprising:
generating, by a communication environment data generating device, communication environment data by observing communication environment conditions;
calculating, by a fluctuation information generating device, a fluctuation term of fluctuation information to be used in the fluctuation equation, by using the communication environment data as the communication environment data occurs, and performing fluctuation equation calculation using the fluctuation term in which the communication environment data is being reflected; and
allocating the communication resources, in a selecting unit, based on output results of the fluctuation equation calculation,
wherein the calculating the fluctuation term comprises shifting an average value of fluctuations toward zero by subtracting an average value of a history of the communication environment data from observed communication environment data, and adjusting an amplitude of the shifted fluctuation term for adaptation to environmental variations by multiplying a given parameter into the shifted fluctuation term,
wherein the communication environment data includes inter-domain control signals at a communication node of a communication network which is made up of a plurality of domains, and
wherein the allocating the communication resources comprises changing a domain to belong for a communication node, based on the output results of the fluctuation equation calculation, and an amount of the inter-domain control signals passing through the communication node.

3. The communication method according to claim 2, wherein the changing the domain to belong for the communication node comprises:
calculating, by a control device of each of the plurality of domains, fluctuation equation information of a communication node belonging to the domain of the control device in accordance with the fluctuation equation; and
performing control of domain change process for a communication node through which control signals pass, wherein a control formula for processing for changing the domain based on calculation of the fluctuation equation information is represented by using an amount of control signal traffic with respect to an amount of user traffic passing through the communication node.

4. A communication device which allocates communication resources based on attractor selection control using a fluctuation equation, comprising:
a communication environment data generating device for generating communication environment data by observing communication environment conditions;
a fluctuation information generating device for calculating a fluctuation term of fluctuation information to be used in the fluctuation equation by using the communication environment data as the communication environment data occurs, and performing fluctuation equation calculation using the fluctuation term in which the communication environment data is being reflected; and
a selecting unit for allocating the communication resources based on output results of the fluctuation equation calculation;
wherein the fluctuation information generating device comprises a fluctuation equation control unit for shifting an average value of fluctuations toward zero by subtracting an average value of a history of the communication environment data from observed communication environment data, and adjusting an amplitude of the shifted fluctuation term for adaptation to environmental variations by multiplying a given parameter into the shifted fluctuation term,
wherein the communication environment data is communication quality information at a plurality of radio interfaces of a communication terminal which is capable of communicating with a plurality of radio base stations, and
wherein the selecting unit selects a radio interface having the largest value of output results of the fluctuation equation calculation.

5. A non-transitory computer-readable recording medium storing a control program which causes a computer of a communication device which allocates communication resources based on attractor selection control using a fluctuation equation, the control program comprising:
a procedure for generating communication environment data by observing communication environment conditions;
a procedure for calculating a fluctuation term of fluctuation information to be used in the fluctuation equation by using the communication environment data as the communication environment data occurs, and performing fluctuation equation calculation using the fluctuation term in which the communication environment data is being reflected, and
a procedure for allocating the communication resources based on output results of the fluctuation equation calculation;
wherein the procedure for calculating the fluctuation term comprises a procedure for shifting an average value of fluctuations toward zero by subtracting an average value of a history of the communication environment data from observed communication environment data, and the procedure for adjusting an amplitude of the shifted fluctuation term for adaptation to environmental variations by multiplying a given parameter into the shifted fluctuation term,
wherein the communication environment data is communication quality information at a plurality of radio interfaces of a communication terminal which is capable of communicating with a plurality of radio base stations, and
wherein the procedure for allocating the communication resources comprises a procedure for selecting a radio interface having the largest value of output results of the fluctuation equation calculation.

6. A communication device which allocates communication resources based on attractor selection control using a fluctuation equation, comprising:
a communication environment data generating device for generating communication environment data generating device by observing communication environment conditions;
a fluctuation information generating device for calculating a fluctuation term of fluctuation information to be used in the fluctuation equation by using the communication environment data as the communication environment data occurs, and performing fluctuation equation calculation using the fluctuation term in which the communication environment data is being reflected; and a selecting unit for allocating the communication resources based on output results of the fluctuation equation calculation, wherein the fluctuation information generating device comprises a fluctuation equation control unit for shifting an average value of fluctuations toward zero by subtracting an average value of a history of the communication environment data from observed communication environment data, and adjusting an amplitude of the shifted fluctuation term for adaptation to environmental variations by multiplying a given parameter into the shifted fluctuation term, wherein the communication environment data includes inter-domain control signals at a communication node of a communication network which is made up of a plurality of domains, and wherein the selecting unit changes a domain to belong for a communication node, based on the output results of the fluctuation equation calculation, and an amount of the inter-domain control signals passing through the communication node.

7. The communication device according to claim 6, wherein the selecting unit of a control device of each of the plurality of domains calculates fluctuation equation information of a communication node belonging to the domain of the control device in accordance with the fluctuation equation, and performs control of domain change process for a communication node through which control signals pass, wherein a control formula for processing for changing the domain based on calculation of the fluctuation equation information is represented by using an amount of control signal traffic with respect to an amount of user traffic passing through the communication node.

8. A non-transitory computer-readable recording medium storing a control program which causes a computer of a communication device which allocates communication resources based on attractor selection control using a fluctuation equation, the control program comprising:

a procedure for generating communication environment data by observing communication environment conditions;

a procedure for calculating a fluctuation term of fluctuation information to be used in the fluctuation equation by using the communication environment data as the communication environment data occurs, and performing fluctuation equation calculation using the fluctuation term in which the communication environment data is being reflected; and a procedure for allocating the communication resources based on output results of-the fluctuation equation calculation;

wherein the procedure for calculating the fluctuation term comprises a procedure for shifting an average value of fluctuations toward zero by subtracting an average value of a history of the communication environment data from observed communication environment data, and the procedure for adjusting an amplitude of the shifted fluctuation term for adaptation to environmental variations by multiplying a given parameter into the shifted fluctuation term, wherein the communication environment data includes inter-domain control signals at a communication node of a communication network which is made up of a plurality of domains, and wherein the procedure for allocating the communication resources comprises a procedure for changing a domain to belong for a communication node, based on the output results of the fluctuation equation calculation and an amount of the inter-domain control signals passing through the communication node.

9. The non-transitory computer-readable recording medium according to claim 8, wherein the procedure for changing the domain to belong for the communication node comprises:

a procedure for calculating, by a control device of each of the plurality of domains, fluctuation equation information of a communication node belonging to the domain of the control device in accordance with the fluctuation equation; and a procedure for performing control of domain change process for a communication node through which control signals passes, wherein a control formula for processing for changing the domain based on calculation of the fluctuation equation information is represented by using an amount of control signal traffic with respect to an amount of user traffic passing through the communication node.

* * * * *